(12) United States Patent
Van De Poel et al.

(10) Patent No.: US 8,325,739 B2
(45) Date of Patent: Dec. 4, 2012

(54) PROCESS FOR MANAGING RESOURCE ADDRESS REQUESTS AND ASSOCIATED GATEWAY DEVICE

(75) Inventors: Dirk Van De Poel, Edegem (BE); Thierry Du Tre, Lochristi (BE)

(73) Assignee: Thomson Licensing, Issy les Moulineaux (FR)

( * ) Notice: Subject to any disclaimer, the term of this patent is extended or adjusted under 35 U.S.C. 154(b) by 257 days.

(21) Appl. No.: 11/918,971

(22) PCT Filed: Apr. 11, 2006

(86) PCT No.: PCT/EP2006/061525
§ 371 (c)(1),
(2), (4) Date: Oct. 22, 2007

(87) PCT Pub. No.: WO2006/114367
PCT Pub. Date: Nov. 2, 2006

(65) Prior Publication Data
US 2009/0059936 A1    Mar. 5, 2009

(30) Foreign Application Priority Data
Apr. 25, 2005  (EP) ..................................... 05447093

(51) Int. Cl.
*H04L 12/28* (2006.01)
(52) U.S. Cl. ......... 370/401; 370/402; 370/404; 370/420
(58) Field of Classification Search .................. 709/223, 709/228, 245, 104.1, 217; 370/401, 395.54, 370/416, 229, 230, 392, 497, 475, 503
See application file for complete search history.

(56) References Cited

U.S. PATENT DOCUMENTS

| 6,023,724 | A | 2/2000 | Bhatia et al. | |
|---|---|---|---|---|
| 8,161,148 | B2 | 4/2012 | Tamura | |
| 2003/0039240 | A1 | 2/2003 | Sutanto | |
| 2004/0083184 | A1* | 4/2004 | Tsuei et al. | 705/74 |
| 2005/0021841 | A1 | 1/2005 | Yoshimoto | |
| 2005/0041602 | A1* | 2/2005 | West et al. | 370/260 |

(Continued)

FOREIGN PATENT DOCUMENTS
EP     1349349     10/2003

(Continued)

OTHER PUBLICATIONS
Search Report Dated Jun. 13, 2006.

*Primary Examiner* — Hassan Phillips
*Assistant Examiner* — Anez Ebrahim
(74) *Attorney, Agent, or Firm* — Robert D. Shedd; Jeffrey M. Navon

(57) ABSTRACT

The invention concerns a gateway device comprising means for connection to a first device and means for connection to a second device for obtaining a network address as a function of a network resource identifier provided by the second device, and means for providing a false network address in response to a network resource identifier provided by the first device in case a real network address cannot be provided. The means for providing a false network address are adapted to provide a distinct false network address for a distinct network resource identifier—when the real address becomes available, a request made on the distinct false address allows the first device to obtain the corresponding real network address. The invention also concerns an associated process.

5 Claims, 3 Drawing Sheets

U.S. PATENT DOCUMENTS

| | | | |
|---|---|---|---|
| 2005/0076139 A1* | 4/2005 | Jinmei et al. | 709/245 |
| 2005/0152395 A1* | 7/2005 | Hales | 370/465 |
| 2005/0210139 A1* | 9/2005 | Hightower et al. | 709/227 |
| 2008/0140847 A1* | 6/2008 | Almog | 709/228 |

FOREIGN PATENT DOCUMENTS

| | | |
|---|---|---|
| JP | 2001285366 | 10/2001 |
| JP | 2004328630 | 11/2004 |
| JP | 200620017 | 1/2006 |

* cited by examiner

| Spoofed IP | FQDN / URL | Actual IP |
|---|---|---|
| a.b.c.d | Proxy.xyz.be | NULL |
| e.f.g.h | www.abc.be | NULL |

Fig. 4

| Spoofed IP | FQDN / URL | Actual IP |
|---|---|---|
| a.b.c.d | Proxy.xyz.be | 80.200.248.199 |
| e.f.g.h | www.abc.be | 216.239.57.104 |

Fig. 5

PROCESS FOR MANAGING RESOURCE ADDRESS REQUESTS AND ASSOCIATED GATEWAY DEVICE

This application claims the benefit, under 35 U.S.C. §365 of International Application PCT/EP2006/061525, filed Apr. 11, 2006, which was published in accordance with PCT Article 21(2) on Nov. 02, 2006 in English and which claims the benefit of European patent application No. 05447093.5, filed on Apr. 25, 2005.

The invention concerns a method for managing network resource address requests, for example from a web browser application, and a gateway device for implementing the method. The invention can be used in a gateway connecting a LAN to an IP network, but is not limited to such a context.

When a client computer equipped with a browser application needs to access an internet server in order to obtain e.g. a so called 'webpage', it needs to know the Internet Protocol (IP) address corresponding to the server providing this page. Usually, the browser initially knows a so-called URL (Uniform Resource Locator) or FQDN (Fully Qualified Domain Name).

A translation of the URL or the FQDN into an actual IP address is performed by a device such as a Domain Name System server, on the basis of the URL or FQDN provided by the client computer.

Once the browser knows the IP address of the device hosting the web page, i.e. the web server, it sets up a connection to this IP address and sends requests for the required information using e.g. the HTTP protocol (Hyper Text Markup Language). The web server responds with an HTML (Hyper Text Markup Language) webpage, a picture, or some other data.

This address translation may be performed over a gateway device, e.g. when the client computer is connected to a local area network or other type of network and is connected to the internet through the gateway device.

A problem may occur when connection to the DNS server(s) is impossible, e.g. the connection between the gateway device and the Internet is disrupted. In this case, the browser cannot obtain an IP address. This results in the browser displaying an error message, such as for example "Host name could not be resolved".

In order to inform the user of the nature of the problem and eventually suggest solutions, it is known to have the gateway device perform so-called "spoofing". This mechanism consists in having the gateway device return to the browser a false IP address, making the browser believe that a connection to the DNS server has been established. The gateway device then intercepts any requests for connection to the spoofed address and behaves as if it were the web server. When it receives a request from the browser, the gateway can then return HTML pages explaining the nature of the problem, e.g. that there is no Internet connectivity because a wrong password was given or because of some other reason.

It is also known to have a spoofed address generated when the DNS server declares that the URL or FQDN is unknown. The purpose of doing this is to have the client send a request to the Web server. It would not establish a connection to send the request if it does not obtain an address.

Browsers or other applications, but also other client components such as an operating system may implement a so-called DNS cache. The DNS cache retains the association between a URL or FQDN and an IP address. The application then does not need to request an IP address a second time, resulting in a faster access to the corresponding information.

However, the presence of the DNS cache may lead to problems when combined with the spoofing mechanism described above. Indeed, once the connection to a DNS server is restored, the application should stop using the spoofed IP address, and again proceed to request the actual IP address for a URL from the DNS server. The fact that the application remembers the spoofed/false IP address leads to the consequence that the user can no longer access the initially requested website, because it does not request the real address again.

It is known in certain applications that closing the application will result in purging the DNS cache.

The invention concerns a gateway device comprising means for connection to a first device and means for connection to a second device for obtaining a network address as a function of a network resource identifier provided by the second device, further comprising:

means for providing a false network address in response to a network resource identifier provided by the first device in case a real network address cannot be provided;

characterized in that said means for providing a false network address are adapted to provide a distinct false network address for a distinct network resource identifier.

This distinct false address can then be used to provide the real address corresponding to the initial resource identifier, once this real address is available.

According to an embodiment of the invention, the device further comprises a server component for providing responses to requests made by the first device on the basis of a false network address.

According to an embodiment of the invention, the responses include information describing the reason of the lack of a real network address.

According to an embodiment of the invention, the device is further adapted to determine a real network address for a network resource identifier for which a false network address was previously provided.

According to an embodiment of the invention, the device further comprises means of redirecting the first device to the real network address upon a request from the first device based on a false network address for which a real network address has been determined.

According to an embodiment of the invention, the device further comprises memory for storing a false network address and its respective network resource identifier.

According to an embodiment of the invention, said memory further stores a real network address corresponding to a network resource identifier, once the real network address is determined.

The invention also concerns a method for managing network resource address requests from a first device to a second device, said method being carried out by a gateway device connected between the first device and the second device, comprising the steps of:

receiving a resource identifier from the first device, determining whether the second device can provide a real network resource address corresponding to the resource identifier, in the affirmative, providing the real network resource address, in the negative, providing a false network resource address, wherein the false network resource address provided is uniquely associated with the received resource identifier.

According to an embodiment of the invention, the method further comprises the steps of receiving a request based on a false network address from the first device and, in response, of redirecting the first device to a server accessible by the first device.

According to an embodiment of the invention, said server provides information on the error condition causing the lack of a real network address.

According to an embodiment of the invention, the method comprises the step, once a real network address can be obtained, of obtaining such a real network address for a previously received resource identifier for which a false network address has been provided.

According to an embodiment of the invention, the method comprises the step, upon reception of a request based on a false network address from the first device, of setting up a connection between the gateway and a device identified by the real network address corresponding to the false network address.

According to an embodiment of the invention, the method comprises the step of storing a received identifier with its associated false network resource address and, when obtained, with the corresponding real network address.

The invention will be explained in detail in a specific embodiment, described with the help of the drawings. The invention should not be limited to the detailed description of the embodiment.

FIG. 4 represents a table indicating the content of an address cache memory of the gateway device, in accordance with the present invention, after requests have been received by the gateway device during a time interval with no connectivity to the DNS server.

FIG. 5 represents the table of FIG. 4 once connectivity has been re-established and 'real' or actual IP addresses have been determined.

Figure 1:
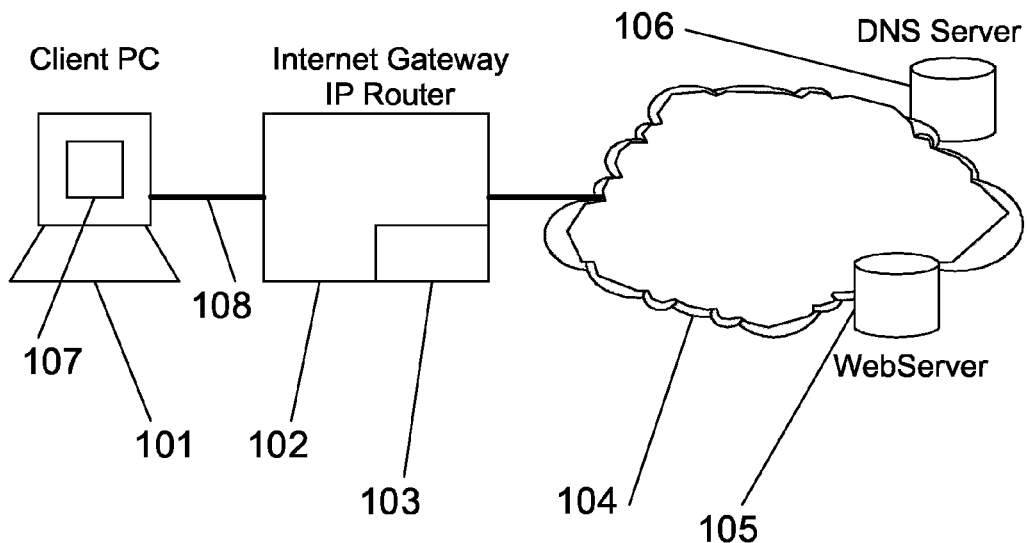
FIG. 1 is a schematic diagram of a local area network and the internet, connected using the gateway device described in the present embodiment.

FIG. 1 represents the gateway 102 object of the present embodiment connecting a local area network 108 to the internet 104. A client computer 101 with an application requiring internet access 107 such as a web browser is connected to the local area network. FIG. 1 shows one DNS server 106 and one Web server 105 connected to the Internet—of course, more DNS servers and Web servers can be connected, and other devices than these two types of servers are also be connected to the internet. Gateway 102 comprises a memory 103 the purpose of which will be described later. According to the present example, the memory is of the semiconductor or equivalent type. The internet application 107 may also be different from a browser, and run on a device other than a computer. It may be for example an IP-enabled audio/video decoder, with an electronic program guide application. Note that the gateway 102 may also be located directly in the device 101—in that case, there is no local area network per se.

Figure 2:
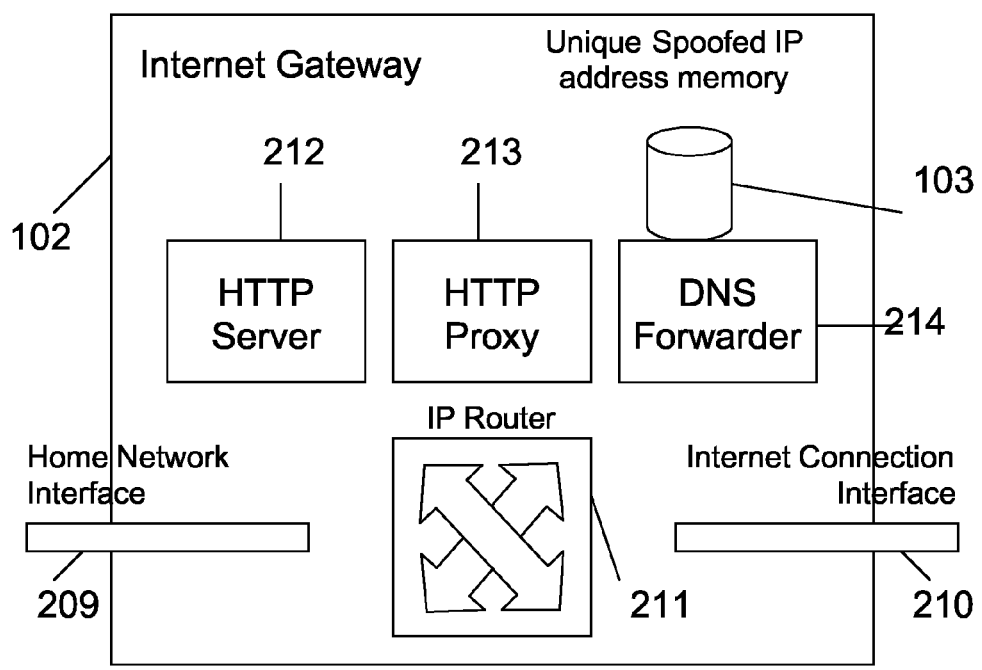
FIG. 2 is a schematic diagram of the gateway device's functional components.

FIG. 2 shows the different functional components of the gateway device 102, which include interfaces 209 and 210, connecting the gateway device respectively to the local area network and to the internet. For example, the local area network may be an Ethernet network, or a wireless IEEE 802.11b type network.

Gateway device 102 furthermore comprises an HTTP server 212, which is an application akin to a web server and which manages and provides web pages corresponding for example to the internal configuration of the gateway device. According to the present embodiment, the HTTP server 212 also provides information to devices making requests to a spoofed IP address.

HTTP proxy 213 acts as a proxy server to a client application on network 108. It receives requests formulated by a client application, forwards these requests when appropriate to a real server such as server 105, and also transmits any response of the real server back to the client application. The HTTP proxy acts as a client application as far as the Web server is concerned.

DNS forwarder 214 is a component which processes the DNS queries received from the client application 107, and forwards them to one or more DNS servers on the internet. This component detects whether a valid response is received from the DNS servers and sends the response back to the client application. The DNS forwarder is also the component which generates 'spoofed' or 'false' IP addresses according to the present embodiment when no proper DNS server response can be obtained for various reasons, and transmits them to a client application. Instead of using just one spoofed/false IP address for responding to DNS requests, when such a spoofed address is needed, the DNS forwarder of the gateway device sends a different spoofed IP address for each new URL or FQDN it receives in a DNS request.

An IP router component 211 forwards IP packets to and from the local area network, the gateway's other components and the internet.

Gateway device 102 also contains memory 103, already briefly mentioned in relation with FIG. 1. Memory 103 stores the spoofed IP addresses determined by the DNS forwarder 214, along with the respective URL or FQDN in response to which they were sent. Gateway 102 is thus capable of determining which spoofed IP address was sent for a given URL/FQDN received and vice-versa.

In what follows, it will be supposed that the gateway device sends spoofed addresses when it detects that there is no internet connectivity. Other conditions may of course also be taken into account.

FIG. 4 gives an example of the contents of memory 103 after reception of two requests from client application 107. It is supposed that the DNS forwarder determined that no proper DNS server response was received for these two requests, and consequently, two different spoofed IP addresses were sent back to client application 107. A column 'Actual IP Address', indicating the real address that the client application expects, remains empty at this stage.

Once a connection to a DNS server can be established by the gateway device, it checks the content of memory 103 and sends a request for an actual IP address to a DNS server for each pair of spoofed IP address and URL or FQDN in its memory and for which no actual IP address could be previously determined.

FIG. 5 shows the state of the memory once the actual IP addresses are determined.

In the present embodiment, the memory stores up to 32 entries. A round robin mechanism deletes the oldest entry when the list is full. According to a variant embodiment, a time-to-live parameter is associated with each entry.

When the gateway device receives a request from the client application containing as destination address one of the spoofed IP addresses (i.e. the client application tries to set up a connection), it look in its cache memory 103 whether that for that spoofed address, an actual IP address has been cached or not.

If there is such an actual IP address, the spoofed IP address in the request is replaced with the actual IP address and the gateway device establishes a connection with the correct server identified by the actual IP address and forwards the original request to that server.

If there is no such actual IP address in the cache memory, the gateway device returns an appropriate message such as an HTML web page to the client application. This message or page preferably comprises an identification of the reason of the lack of actual IP address, as far as the gateway device could ascertain. For example, the gateway device may carry out tests to determine the cause or causes of the error condition. In other words, the HTTP protocol allows a server to redirect the client to another location using a new URL.

Figure 3:
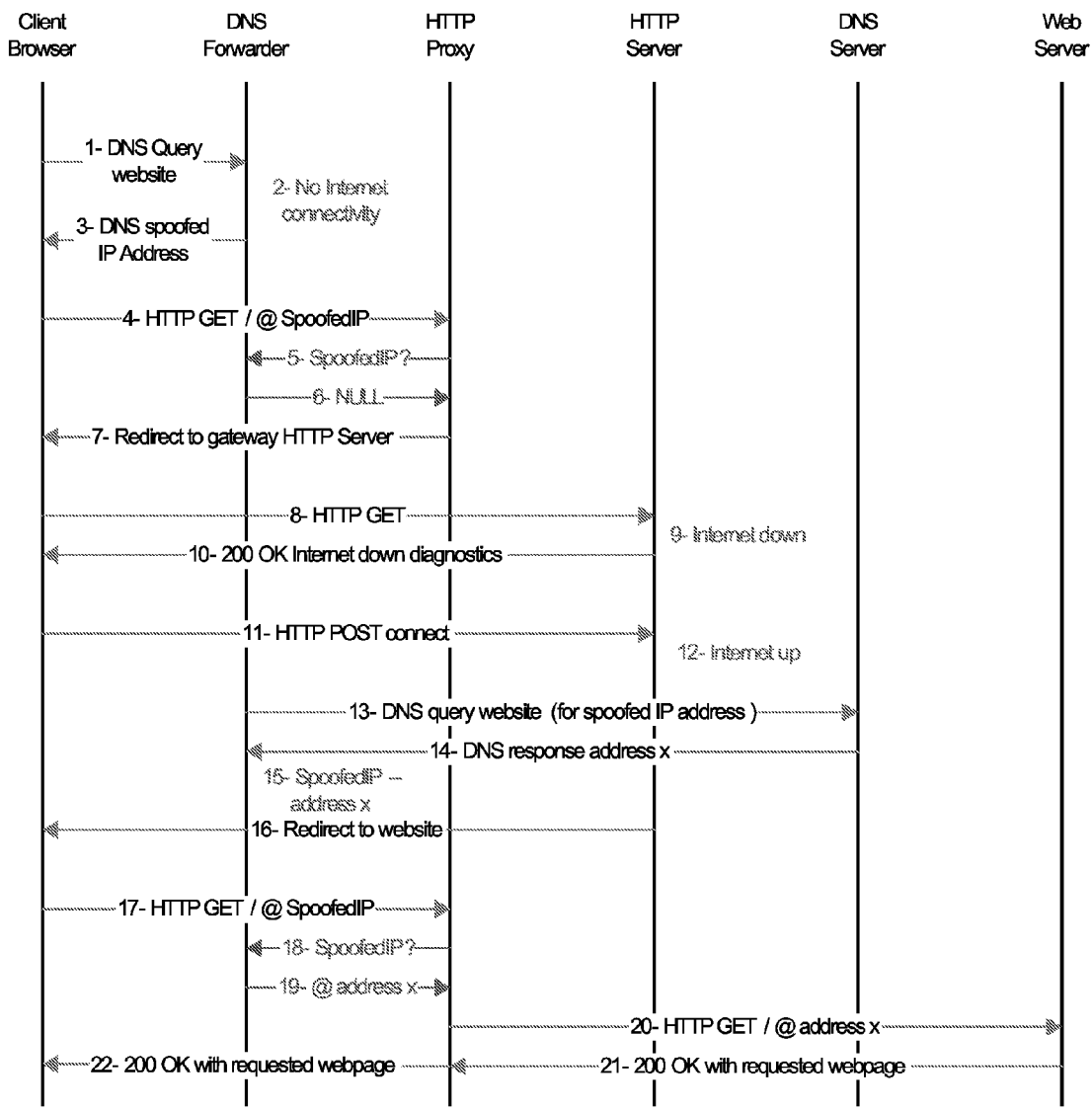
FIG. 3 is a message sequence chart describing the communications between a client application, components of the gateway device and a DNS server according to the present embodiment.

FIG. 3 is a detailed chart of the messages exchanges and actions of the client application, the gateway device's components, the DNS server and the web server.

The different steps are described below:

Step 1: The web browser on the client device (and more precisely the operating systems on the browser's behalf) sends a DNS query to the DNS forwarder requesting the IP address corresponding to a web site URL (e.g. www.xyz.com)

Step 2: The gateway device's DNS forwarder detects that there is no connectivity to the Internet (and as result to the actual DNS servers).

Step 3: The DNS forwarder decides to respond with a spoofed/false IP address. It updates its cache/table with the unique association between the spoofed IP address and the URL/FQDN.

Step 4: Because the web browser thinks the web site's address is the spoofed/false IP address, it establishes a connection to it. The gateway device 102 "intercepts" this connection request, and the connection is established to the gateway's HTTP proxy module. The web browser sends the HTTP request for the website.

Step 5: The HTTP proxy detects the spoofed/false IP address. The component queries the DNS forwarder to learn whether there is an actual IP address corresponding to this spoofed IP address.

Step 6: The DNS forwarder checks its cache/table and learns that the URL/FQDN related to this spoofed IP address was not resolved in an actual IP address. It tells the HTTP proxy that there is no actual IP address.

Step 7: Knowing there is no actual IP address related to this spoofed IP address, the HTTP proxy redirects the web browser to a web page hosted by the gateway device's HTTP server: it indicates a new URL to the web browser.

Step 8: The web browser now establishes a connection to the gateway device and sends a HTTP request for the web page to the local server of the gateway.

Step 9: The HTTP server web page detects there is no Internet connectivity or can do other diagnostics tests.

Step 10: The HTTP server responds with a HTML page explaining the problem and e.g. containing possible solutions to the Internet connectivity problem, based on diagnostic tests carried out by the gateway device.

Step 11: The user takes corrective action (for example reconnecting cables, or correcting the Internet connection password) and presses a button or clicks on a link on the screen. This triggers sending for example the corrected password back to the HTTP server.

Step 12: The HTTP server now detects that the Internet connection is established again. The addresses of the DNS servers are dynamically retrieved by the gateway when the Internet connection is established. Together with an Internet address, the gateway also receives the addresses of one or more DNS servers.

Step 13: Establishment of Internet connectivity triggers the gateway device's DNS forwarding component to send out DNS queries for the URLs for which "spoofed"/false IP addresses were sent. It sends these queries to the addresses of the DNS server(s) on the Internet.

Step 14: The DNS server(s) responds with the actual or 'real' IP addresses corresponding to the URLs.

Step 15: The DNS forwarder updates its cache/table with spoofed IP addresses, URL (FQDN) and actual IP addresses.

Step 16: Knowing the Internet connectivity is established again, the Internet gateway HTTP server redirects the web browser to the originally requested web site again. The HTTP server remembered the URL of the originally requested website that was previously exchanged between the HTTP proxy and the HTTP server.

Step 17: The web browser now uses the cached relation between the original web site and the spoofed/false IP address and connects to the spoofed/false IP address again. The gateway device "intercepts" this connection so in fact the connection is established to the gateway device's HTTP proxy module.

Step 18: The HTTP proxy component queries the DNS forwarder component to learn whether there is an actual IP address corresponding to the spoofed IP address.

Step 19: The DNS forwarder component responds with the actual IP address received from the DNS server in step 14.

Step 20: The HTTP proxy replaces the spoofed IP address with the actual IP address and establishes a connection to the web server requesting the webpage.

Step 21: The web server responds with the requested HTML webpage.

Step 22: The HTTP proxy now forwards the response received from the web server to the client computer web browser. The user on the client computer automatically receives the requested web site. The client application thus accesses the correct server, although it continues to use the spoofed IP address.

Note that most operating systems include their own DNS cache. This is a module that remembers DNS results, URL/FQDN correspondence to IP address, with a time-to-live ('ttl') parameter. Applications running 'above' or 'on' the operating system, such as web browser, also have their own cache. But they do not take the ttl parameter into account.

In a variant embodiment, the step of checking whether a real address is available for a spoofed address in memory 103 is carried out by IP router 211 instead of HTTP Proxy 213. Also, the step of replacing the spoofed IP address by a real IP address may be carried out by the IP router (step 20). The HTTP proxy checks for the presence of a spoofed IP address and redirects the client application to the local HTTP server when such an address is detected. It does not query the table in memory 103. This embodiment not only provides a solution for the common problem of a web browser incorrectly remembering a (false) address; it is also applicable to other programs that might remember addresses in their own DNS cache.

Although the description of the embodiment is based on an Internet Protocol network implementation, the invention may be adapted to other contexts where an identifier needs to be replaced by an address and in which caching of responses in that frame may pose a problem.

The invention claimed is:

1. In a gateway device connecting a first and a second network, a method of managing domain name server (DNS) requests originating from a first network device attached to the first network, the reply to the DNS request providing a network address corresponding to a network resource identifier of a second network device attached to the second network, the method, at the gateway device, comprising the steps of:

receiving, from the first network device, a DNS request, forwarding the DNS request to a DNS device attached to the second network, for obtaining a network address corresponding to a network resource identifier specified in the DNS request, if a valid response from the DNS is received, sending the response to the first network device that issued the request, if a valid response from the DNS is not received generating a spoofed network address, and sending the spoofed network address to said first network device, wherein a unique spoofed network address is provided for each requested network resource identifier, creating a reference table of spoofed network addresses that have been forwarded and storing the spoofed network address and the associated network resource identifier in the reference table, after sending the spoofed network address to the first network device, continue trying to obtain, from the DNS, an actual network address for the network resource identifier for which the spoofed network address had been generated, when an actual network address is obtained from the DNS for the network resource identifier for which the spoofed network address had been generated, updating the reference table with the actual network address, cross-referencing in the reference table the actual network address against the spoofed network address that has been forwarded, and in case a request from the first device for accessing the second device using the spoofed network address is received, forwarding the request using the actual network address stored in the reference table.

2. The method of claim 1, further including providing to the first network device and in addition to the spoofed network address, information on the error condition causing the provision of the spoofed network address.

3. The method of claim 1, wherein the first network is a local area network and the second network is the Internet, and wherein the network address is an Internet Protocol address and the network resource identifier is a Uniform Resource Locator.

4. A gateway device comprising a first and a second network interface, a router, a memory storing unique spoofed network addresses, and a DNS forwarder, wherein the gateway device is adapted to carry out the method of claim 1.

5. The gateway device of claim 4, further comprising an HTTP server and being adapted to carry out the method of claim 3.

* * * * *